(12) United States Patent
Tuckey et al.

(10) Patent No.: US 11,398,727 B2
(45) Date of Patent: Jul. 26, 2022

(54) METHOD OF CONTROLLING A MICROGRID, POWER MANAGEMENT SYSTEM, AND ENERGY MANAGEMENT SYSTEM

(71) Applicant: Hitachi Energy Switzerland AG, Baden (CH)

(72) Inventors: Andrew Tuckey, Livingstone (AU); Francesco Baccino, Savona (IT)

(73) Assignee: HITACHI ENERGY SWITZERLAND AG, Baden (CH)

( * ) Notice: Subject to any disclaimer, the term of this patent is extended or adjusted under 35 U.S.C. 154(b) by 250 days.

(21) Appl. No.: 16/799,016

(22) Filed: Feb. 24, 2020

(65) Prior Publication Data

US 2020/0274356 A1 Aug. 27, 2020

(30) Foreign Application Priority Data

Feb. 22, 2019 (EP) .................................... 19158749

(51) Int. Cl.
| | |
|---|---|
| H02J 3/00 | (2006.01) |
| G05B 13/04 | (2006.01) |
| H02J 3/38 | (2006.01) |

(52) U.S. Cl.
CPC ............ H02J 3/003 (2020.01); G05B 13/048 (2013.01); H02J 3/381 (2013.01); *H02J 2300/24* (2020.01); *H02J 2300/28* (2020.01)

(58) Field of Classification Search
CPC ........ H02J 3/003; H02J 3/381; H02J 2300/28; H02J 2300/24; H02J 2310/10; H02J 2300/20; H02J 3/46; H02J 2203/20; H02J 3/14; G05B 13/048; Y02P 80/14; Y04S 20/222; Y04S 40/20; Y02B 70/3225; Y02E 60/00; Y02E 10/56
See application file for complete search history.

(56) References Cited

U.S. PATENT DOCUMENTS

| | | | |
|---|---|---|---|
| 9,690,312 B2 * | 6/2017 | Steven | G06Q 10/04 |
| 2010/0179704 A1 * | 7/2010 | Ozog | G06Q 30/0283 703/2 |
| 2011/0231028 A1 * | 9/2011 | Ozog | H02J 3/008 700/291 |
| 2012/0150679 A1 * | 6/2012 | Lazaris | H02J 3/386 705/26.2 |
| 2014/0039709 A1 * | 2/2014 | Steven | H02J 3/008 700/291 |
| 2014/0148963 A1 | 5/2014 | Ozog | |
| 2015/0039145 A1 * | 2/2015 | Yang | G05B 13/02 700/291 |
| 2015/0381089 A1 * | 12/2015 | Tarnowski | H02J 3/38 307/84 |
| 2017/0317499 A1 * | 11/2017 | Tang | G05F 1/66 |
| 2019/0036340 A1 | 1/2019 | Meeker et al. | |

* cited by examiner

*Primary Examiner* — Ziaul Karim
(74) *Attorney, Agent, or Firm* — Slater Matsil, LLP

(57) ABSTRACT

A method of controlling a microgrid includes retrieving, by an energy management system, EMS, a forecast variable value for a forecast variable. The EMS determines an operating point value for a controllable asset that depends on the retrieved forecast variable value. The EMS determines an operating point shift value for the controllable asset, the operating point shift value representing a shift in operating point value in response to a variation in forecast variable value. The operating point value and the operating point shift value are provided to a power management system, PMS, of the microgrid.

19 Claims, 13 Drawing Sheets

METHOD OF CONTROLLING A MICROGRID, POWER MANAGEMENT SYSTEM, AND ENERGY MANAGEMENT SYSTEM

FIELD OF THE INVENTION

Embodiments of the invention relate to methods, devices and systems for controlling a microgrid. Embodiments of the invention relate in particular to methods, devices and systems that use one or several forecast variables to determine operating points for controllable assets of a microgrid, such as controllable power-generating assets and/or controllable loads of a microgrid.

BACKGROUND OF THE INVENTION

A microgrid is a localized group of generators and loads. Control strategies for microgrids are getting increasingly important, also due to the increasing use of renewable energy sources (RES) or other systems with distributed energy generators (DEG). Control techniques for microgrids are described in, e.g., IEEE 2030.7-2017.

A microgrid control system may be a Power Management System (PMS) that can coordinate a plurality of individual controllable power-generating assets and discretionary load (DL) assets in a predefined way. The Operating Point (OP) of each asset may be calculated in real-time based on locally known values, such as total load, microgrid configuration, storage state of charge (SoC), current photovoltaic (PV) and wind availability, current energy market pricing etc. In such a case, the optimization that is attained may be limited because the PMS only knows local values and has only past and present-time data.

In order to further improve the determination of an operating point, an Energy Management System (EMS) may use forecasts to calculate a better optimal OP for each of the assets. Forecasts can be or can include forecast values for load profiles, photovoltaic and wind availability, weather and cloud forecasting, energy market pricing etc. With the use of past, present and forecasted data, the EMS is adapted to calculate the optimal OP for each asset.

The EMS typically provides an EMS asset operating point vector, which is also referred to as EMS OP vector, to the PMS. The PMS controls the assets so that their power values are in conformity with the operating point values included in the operating point vector for each of the controllable assets of the microgrid.

However, when one or several forecast variable values are incorrect, i.e., the actual values differ from the forecast variable values, the calculated operating point vector is typically also incorrect. This may result in power imbalance or the risk of non-optimal operation. In particular, the calculated operating point vector would often result in a total power generation that is offset from a desired target power generation or power consumption of the controllable assets in the microgrid, if the forecast variables are incorrect.

SUMMARY

In view of the above, there is a continued need for methods, devices, systems, and microgrids that provide enhanced robustness when an operating point vector is determined based at least in part on forecast variable values, which may be incorrect. There is a need for methods, devices, systems, and microgrids that allow the operating point of a plurality of controllable assets of the microgrid to be updated so as to at least partially compensate for a deviation of a forecast variable value from the actual value of this variable that may subsequently become available.

According to the invention, methods, an energy management system (EMS), a power management system (PMS), and a microgrid as recited in the independent claims are provided. The dependent claims define embodiments.

According to an aspect of the invention, methods and control systems are disclosed that are operative to update operating point values (such as a power setpoint or power limit of an asset). The amount by which the operating point value for a controllable power-generating asset is changed is dependent on a new parameter that is introduced in this application and that reflects how strongly the optimum operating point varies in response to a variation in the forecast variable around a forecast variable value that has been used to determine the operating point value for a controllable power-generating asset.

This new parameter, which is also referred to as "operating point shift value" herein, may be considered to be a derivative (which may also be a discrete derivative) of a function that represents the operating point value as a function of forecast variable value.

For illustration, if the operating point is a power setpoint of a generator and the forecast variable value is a forecast load, the operating point shift value may be determined as derivative of the power setpoint as a function of the forecast load, determined for the forecast load value that has been used in determining the optimal power setpoint for the generator.

If the operating point is a power intake of a discretionary load and the forecast variable is a forecast load (i.e., a forecast total load in the microgrid), the operating point shift value may be determined as derivative of the power intake of the discretionary load as a function of the forecast load of the microgrid, determined for the forecast load value that has been used in determining the optimal power intake for the discretionary load.

The operating point shift value may be computed by an EMS and may be provided to the PMS for subsequent use.

The PMS may use the operating point value received from the EMS and the operating point shift value received from the EMS to compute an updated operating point value (which may be an updated power setpoint of a controllable power-generating asset, an updated power limit of a controllable power-generating asset, or an updated load setpoint of a controllable load) when the actual value of a forecast variable (such as load or wind speed) deviates from the forecast variable value that has been used by the EMS in an optimization routine.

Various effects are associated with this technique. For illustration, a deviation between an actual value and a forecast variable value of a forecast variable may be compensated, fully or at least to a significant extent, as the need arises in the PMS. The increase in computational complexity of the processing that is done at the EMS is moderate. The increase in bandwidth requirements between the EMS and PMS is moderate.

A method of controlling a microgrid including a plurality of controllable assets comprises retrieving, by an energy management system, EMS, a forecast variable value for a forecast variable; determining, by the EMS, an operating point value for a controllable asset that depends on the retrieved forecast variable value; determining, by the EMS, an operating point shift value for the controllable asset, the operating point shift value representing a shift in operating point value in response to a variation in forecast variable value; and providing the operating point value and the operating point shift value to a power management system, PMS, of the microgrid.

The plurality of controllable assets may comprise controllable power-generating assets and/or controllable loads, such as controllable discretionary loads.

The operating point value may be a function of the forecast variable value.

The operating point shift value may be dependent on a derivative of the function that represents the operating point value in dependence on the forecast variable value.

The operating point shift value may be the derivative of the function that represents the operating point value in dependence on the forecast variable value.

The received operating point shift values may be or may comprise derivates of power setpoints or power limits of power-generating assets.

The received operating point shift values may be or may comprise derivates of load power setpoints. The load power setpoints may be load power setpoints of one or several discretional loads (DL). The load power setpoints may be discrete load power setpoints, e.g. "full power," "half power," "off," or may be continuous load power setpoints, or may be a combination of both.

The derivative may be a discrete derivative.

The method may comprise providing the forecast variable value to the PMS of the microgrid.

The EMS may retrieve plural forecast variable values for plural forecast variables, may determine plural operating point shift values that are indicative of shifts in operating point value in response to variations of the plural forecast variable values, and may provide the operating point value and the plural operating point shift values to the PMS.

The EMS may determine the operating point value and the operating point shift value for each one of the plurality of controllable assets.

The plurality of controllable assets may comprise one or several controllable power-generating assets and/or one or several controllable loads.

Determining the operating point shift values for the plurality of controllable assets may comprise enforcing a constraint on a sum of the operating point shift values.

The constraint may ensure that the sum of the operating point shift values is equal to 1.

The EMS may determine several additional operating point values and several additional operating point shift values for modified forecast variable values that deviate from the retrieved forecast variable value.

The modified forecast variable values may be determined by the EMS. The modified forecast variable values may thereby be generated by the EMS, rather than corresponding to any forecast variable value that is retrieved from a forecast server.

One or several of the modified forecast variable values may be determined by the EMS as a function of a retrieved forecast variable value.

One or several of the modified forecast variable values may be determined by the EMS independently of any retrieved forecast variable value.

One or several of the modified forecast variable values may be determined by the EMS based on a statistical distribution. The statistical distribution may be determined from historical data of retrieved forecast variable values.

The EMS may provide the several additional operating point values and several additional operating point shift values to the PMS.

The modified forecast variable values may deviate from the retrieved forecast variable value by pre-defined percentages or by pre-defined absolute differences.

The several additional operating point values and several additional operating point shift values may be determined for the modified forecast variable values that are generated by the EMS based on the retrieved forecast variable value.

The method may further comprise receiving, by the PMS, the operating point value and the operating point shift value for the controllable asset.

Operating point values and operating point shift values may be received by the PMS for a plurality of controllable assets of the microgrid, in particular for each controllable asset of the microgrid.

The method may further comprise determining, by the PMS, an updated operating point value for the controllable asset in dependence on the operating point value for the controllable asset, the operating point shift value for the controllable asset, and a difference between an actual value and the forecast variable value for the forecast variable.

The method may further comprise controlling, by the PMS, the controllable asset based on the updated operating point value.

The PMS may receive, for each one of several controllable assets of the microgrid, an associated operating point value and an associated operating point shift value and may determine an updated operating point value for each one of the several controllable assets based thereon.

The PMS may determine the updated operating point value in accordance with $$OPV = C_{OPV} + K_{OP} \times \Delta FVV,$$

where OPV denotes the updated operating point value for the controllable asset, $C_{OPV}$ denotes the operating point value for the controllable asset received from the EMS, $K_{OP}$ denotes the operating point shift value for the controllable asset, and $\Delta FVV$ denotes the difference between the actual value of the forecast variable and the forecast variable value for which the operating point value was determined.

The method may further comprise controlling, by the PMS, a controllable asset for which no updated operating point value has been determined based on the received operating point value.

An energy management system, EMS, for a microgrid comprises an interface operative to retrieve a forecast variable value for a forecast variable and at least one integrated semiconductor circuit operative to determine an operating point value for a controllable asset that depends on the retrieved forecast variable value. The at least one semiconductor circuit is operative to determine an operating point shift value for the controllable asset, the operating point shift value representing a shift in operating point value in response to a variation in forecast variable value. The at least one semiconductor circuit is operative to provide the operating point value and the operating point shift value to a power management system, PMS, of the microgrid.

The EMS may be operative such that the operating point value is a function of the forecast variable value.

The EMS may be operative such that the operating point shift value is dependent on a derivative of the function that represents the operating point value in dependence on the forecast variable value.

The EMS may be operative to compute the operating point shift value as the derivative of the function that represents the operating point value in dependence on the forecast variable value.

The EMS may be operative to calculate the derivative as a discrete derivative.

The EMS may be operative to provide the forecast variable value to the PMS of the microgrid.

The EMS may be operative to retrieve plural forecast variable values for plural forecast variables, to determine plural operating point shift values that are indicative of shifts in operating point value in response to variations of the plural forecast variable values, and to provide the operating point value and the plural operating point shift values to the PMS.

The EMS may be operative to determine the operating point value and the operating point shift value for each one of the plurality of controllable assets.

The EMS may be operative such that determining the operating point shift values for the plurality of controllable assets comprises enforcing a constraint on a sum of the operating point shift values.

The constraint may ensure that the sum of the operating point shift values is equal to 1.

The EMS may be operative to determine several additional operating point values and several additional operating point shift values for modified forecast variable values that deviate from the retrieved forecast variable value.

The EMS may be operative such that several additional operating point vectors are determined for the modified forecast variable values that are determined by the EMS. The modified forecast variable values may thereby be generated by the EMS, rather than corresponding to any forecast variable value that is retrieved from a forecast server.

The EMS may be operative such that one or several of the modified forecast variable values are determined as a function of a retrieved forecast variable value.

The EMS may be operative such that one or several of the modified forecast variable values are determined independently of any retrieved forecast variable value.

The EMS may be operative such that one or several of the modified forecast variable values may be determined by the EMS based on a statistical distribution. The statistical distribution may be determined from historical data of retrieved forecast variable values.

The EMS may be operative such that the modified forecast variable values deviate from the retrieved forecast variable value by pre-defined percentages or by pre-defined absolute differences.

The EMS may be operative to provide the several additional operating point values and several additional operating point shift values to the PMS.

A power management system, PMS, for a microgrid comprises an interface operative to receive an operating point value and an operating point shift value for a controllable asset of the microgrid from an energy management system, EMS, and at least one integrated semiconductor circuit operative to determine an updated operating point value for the controllable asset in dependence on the operating point value for the controllable asset, the operating point shift value for the controllable asset, and a difference between an actual value and a forecast variable value for the forecast variable.

The PMS may be operative to control the controllable asset based on the updated operating point value.

The at least one integrated semiconductor circuit may be operative to determine the updated operating point value in accordance with $$OPV = C_{OPV} + K_{OP} \times \Delta FVV,$$

where OPV denotes the updated operating point value for the controllable asset, $C_{OPV}$ denotes the operating point value for the controllable asset received from the EMS, $K_{OP}$ denotes the operating point shift value for the controllable asset, and $\Delta FVV$ denotes the difference between the actual value of the forecast variable and the forecast variable value for which the operating point value was determined.

The PMS may be operative to receive, for each one of several controllable assets of the microgrid, an associated operating point value and an associated operating point shift value and to determine an updated operating point value for each one of the several controllable assets based thereon.

The PMS may be operative to control a controllable asset for which no updated operating point value has been determined based on the received operating point value.

The PMS may be operative to receive from the EMS several additional operating point values and several additional operating point shift values for modified forecast variable values that deviate from the retrieved forecast variable value.

The PMS may be operative to select, based on an actual forecast variable value, one operating point value from a plurality of operating point values that consists of the operating point value for the retrieved forecast variable value and the several additional operating point values.

The PMS may be operative to update the selected operating point value based on the operating point shift value associated with that operating point value and a difference between an actual forecast variable value and the forecast variable value that has been used by the EMS.

A microgrid according to an embodiment comprises a plurality of controllable power-generating assets, the power management system of an embodiment and/or the energy management system of an embodiment.

The microgrid may optionally comprise one or several loads.

The plurality of controllable assets may comprise controllable power-generating assets and/or controllable loads, such as controllable discretionary loads.

The plurality of controllable assets may comprise renewable energy sources.

The plurality of controllable assets may optionally comprise one or several generators and/or one or several ESS.

The plurality of controllable assets may form a distributed energy generation system (DEG).

The PMS and/or EMS may be operative to perform the method according to the various embodiments disclosed herein.

Various effects are attained using the methods and control systems according to embodiments. The methods and control systems according to embodiments address the need for enhanced robustness against possibly incorrect forecast variable values. The methods and control systems according to embodiments mitigate the risk that a total power provided by a plurality of controllable assets in the microgrid is different from a desired target power.

BRIEF DESCRIPTION OF THE DRAWINGS

The subject matter of the invention will be explained in more detail with reference to preferred exemplary embodiments which are illustrated in the attached drawings, in which.

DETAILED DESCRIPTION OF EMBODIMENTS

Exemplary embodiments of the invention will be described with reference to the drawings in which identical or similar reference signs designate identical or similar elements. While some embodiments will be described in the context of exemplary charging infrastructure concepts and/or exemplary on-board battery concepts, the embodiments are not limited thereto. The features of embodiments may be combined with each other, unless specifically noted otherwise.

Embodiments of the invention may be used to provide enhanced robustness in the control of a microgrid against possibly incorrect forecast variable values that are used to determine operating point values for controllable assets in the microgrid.

Figure 1:
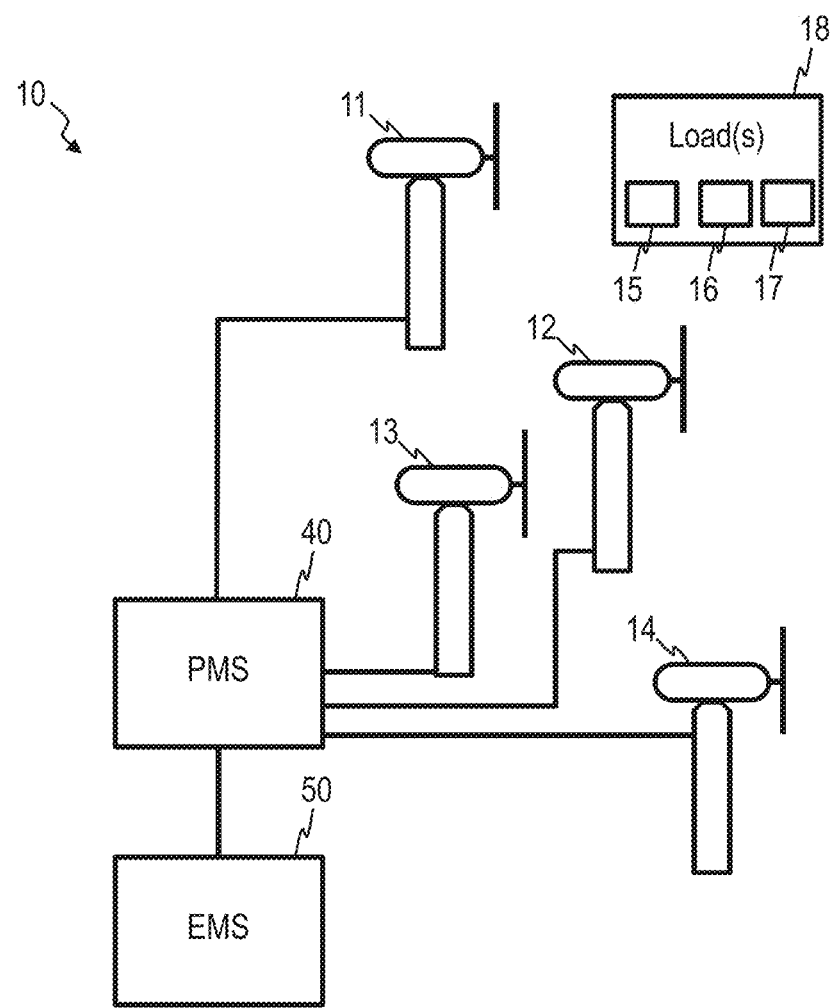
FIG. 1 is a schematic representation of a microgrid.

FIG. 1 shows an exemplary microgrid 10, which comprises a plurality of controllable power-generating assets 11, 12, 13, 14. The microgrid 10 may further comprise one or several loads 18, which may comprise one or several controllable loads 15, 16, 17. The one or several controllable loads 15, 16, 17 may comprise one or several discretionary loads. Power generation in the microgrid 10 is controlled by control systems, which include a power management system 40 and/or an energy management system 50. Operation of the power management (PMS) 40 and the energy management system (EMS) 50 according to exemplary embodiments will be described in more detail herein.

The microgrid 10 may be connected to a macrogrid. The microgrid 10 may comprise circuit breakers or other disconnectors for controllably connecting and disconnecting the microgrid from the macrogrid.

Figure 2:
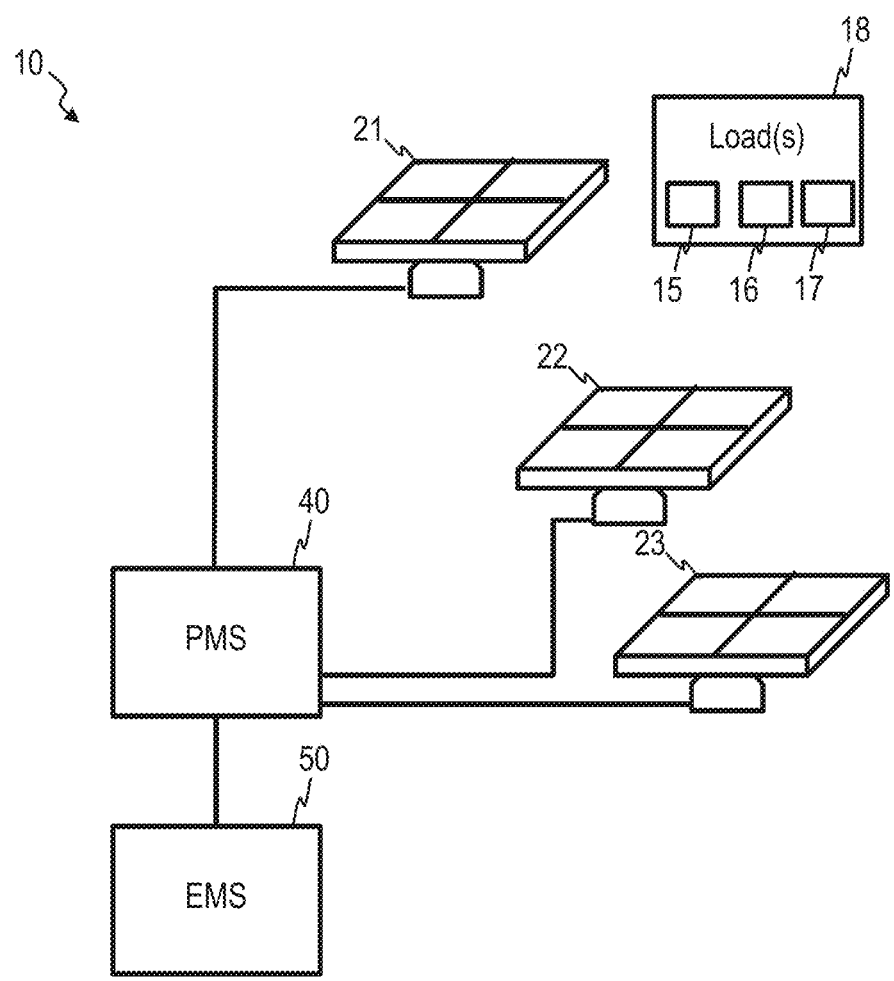
FIG. 2 is a schematic representation of a microgrid.

The plurality of controllable power-generating assets 11, 12, 13, 14 may comprise renewable energy sources (RES), such as wind turbines as shown in FIG. 1 or photovoltaic modules 21, 22, 23 as shown in FIG. 2. The plurality of controllable power-generating assets may comprise gas turbines or other generators that operate based on fossil fuels, or energy storage systems (ESS).

The plurality of controllable loads 15, 16, 17 may comprise discretionary loads.

Figure 3:
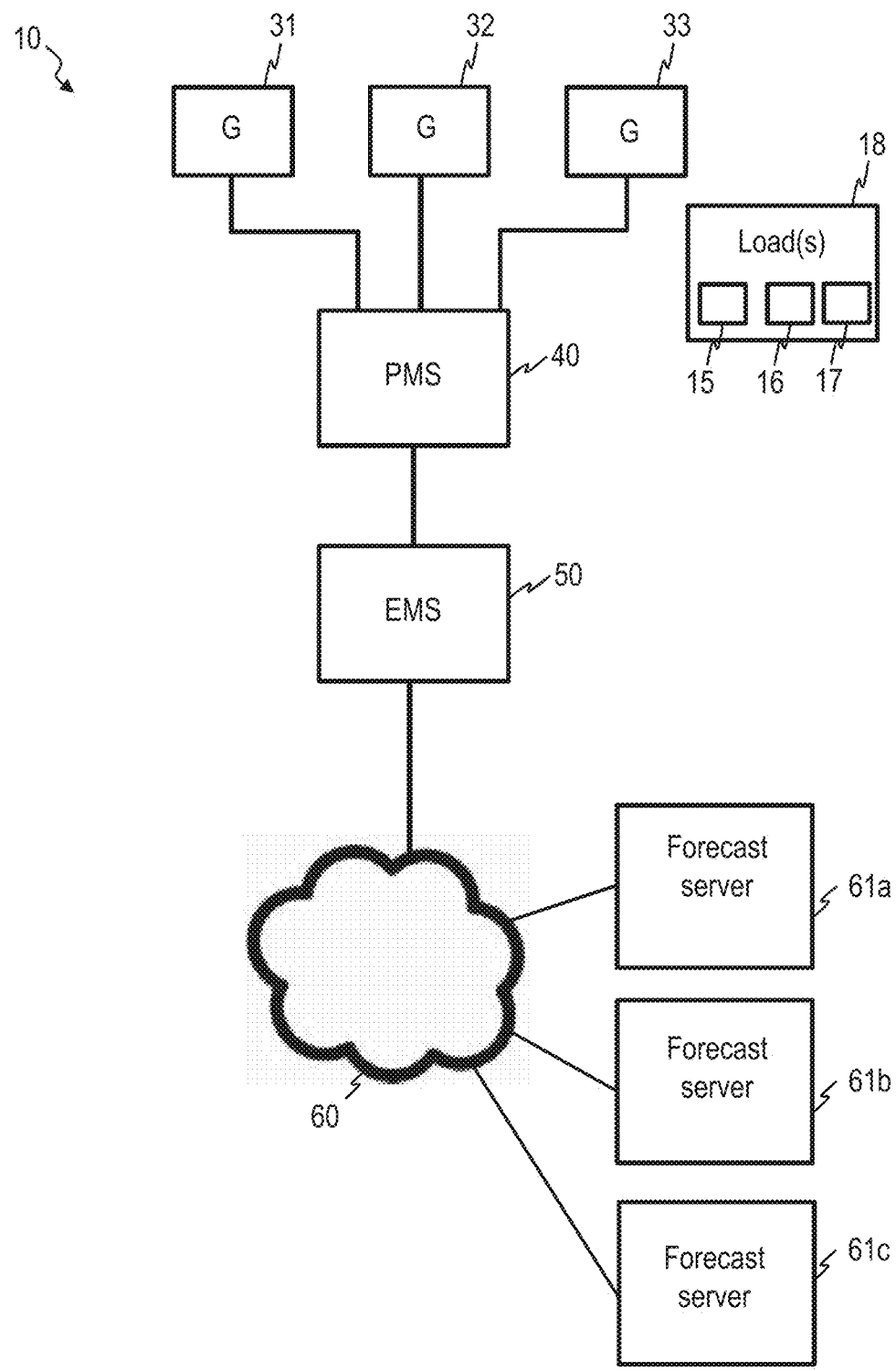
FIG. 3 is a schematic representation of a microgrid.

The plurality of controllable power-generating assets 31, 32, 33 are generally illustrated as blocks in FIG. 3, it being understood that the controllable power-generating assets may include wind turbines, photovoltaic modules, other renewable energy sources, generators that consume fossil fuels, or BESS.

The PMS 40 may control and coordinate the individual assets, in particular the controllable power-generating assets and/or controllable loads. The PMS 40 may be operative to use locally known parameters, such as total load, microgrid configuration, storage state of charge (SoC), current PV and wind availability, current energy market pricing etc. for control purposes. The PMS 40 may also include an optimization engine that optimizes operation based on the data available to the PMS 40. This optimization may be limited, as the PMS 40 typically only has access to the locally available values and past and present-time data.

The EMS 50 may include an optimization system that uses forecasts in addition to past and present local data to calculate a better optimal operating point for each of the assets. Forecasts can be for load profiles, PV and wind availability, weather and cloud forecasting, energy market pricing etc.

The EMS 50 may be connected to forecast servers 61a, 61b, 61c via a wide area network 60. The forecast servers may comprise weather forecast servers, energy market price forecast servers, load profile forecast servers, or other forecast servers.

The EMS 50 may execute an optimization procedure to determine optimal operating points for one or several controllable assets, in particular controllable power-generating assets and/or controllable loads of the microgrid 10. The result of the optimization procedure may be an optimal operating point value $C_{OPV,i}$ for each of the assets. The set of operating point values may be included in an order to list or tuple that is also referred to as operating point vector for in the art. For illustration, the set of operating point values may be represented as an operating point vector having the form $$\overline{COPV} = \begin{pmatrix} C_{OPV,1} \\ C_{OPV,2} \\ \vdots \end{pmatrix}. \qquad (1)$$

In Equation (1), the value $C_{OPV,i}$ designates the operating point value for the controllable asset i, where the index i is an identifier for the respective asset. The operating point values $C_{OPV,i}$ are determined by the EMS 50 in such a way that the resulting operating conditions of the assets of the microgrid will be optimal, provided that the forecasted data (such as wind speed or expected load) at the respective point in time in the future (such as several minutes or several hours after the operating point vector has been determined) corresponds to the retrieved forecast variable value used by the EMS 50.

With the use of past, present and future (forecasted) data the EMS calculates the best or optimal operating point value for each asset in the form of a power setpoint (e.g. for generators, ESSs, etc.), a power limit (for PV, wind turbines, etc.) or a load power setpoint (e.g., for discretionary loads).

This set of operating point values is "optimal" in that it results in an improved metric. Example improved metrics include less fossil fuel usage, lower emission of $CO_2$, lower cost of operation, higher revenue, higher profit, without being limited thereto.

The EMS 50 outputs the operating point vector, which is also simply referred to as the OP vector. The operating point values may respectively be a setpoint (e.g., a power value at which a generator or BESS operates) or a limit (e.g., an upper limit on the power provided by a renewable energy source).

This operating point vector is provided to the PMS 40 which controls the assets of the microgrid.

According to the invention, techniques are provided that mitigate the problems that are conventionally encountered when the actual value of a forecast variable is different from the forecast variable value that has been used by the EMS 50. For illustration, an actual variable value for the forecast variable "overall load of the microgrid at 3:00 p.m." may be different from the forecast variable value for this forecast variable value that has been used by the EMS 50. The microgrid 10 has to operate with a proper power balance. When the actual value and forecast variable value for a forecast variable differ from each other, it may no longer be possible to operate in accordance with the operating point vector that was originally provided by the EMS 50.

The operating point value of one or several of the assets is allowed to become different (i.e., is modified) from the operating point value $C_{OPV,i}$ in the operating point vector. This means the PMS 40 generates updated operating point values, in a manner that will be described in more detail below. The updated operating point values for one or several of the controllable assets can be different from the operating point values $C_{OPV,i}$ provided by the EMS 50.

The techniques disclosed herein address the need for determining updated operating point values for the controllable assets, which may no longer be truly optimal, but at least insure a proper power balance (i.e., a match between the total amount of generated power on the one hand and the total power consumption by the loads and by losses on the other hand) when the actual value of a forecast variable deviates from the forecast variable value that has previously been used by the EMS 50.

According to the techniques of this invention, the EMS does not only determine and provide an operating point value, but also determines are new parameter that is referred to as operating point shift value herein. The operating point shift value quantifies by how much the optimal operating point, determined by the EMS based on a retrieved forecast variable value, varies in response to a variation of the forecast variable around the retrieved forecast variable value. The operating point shift value is a derivative of the function that represents the operating point value in dependence on the retrieved forecast variable value.

According to the techniques of this invention, the PMS 40 does not only receive the operating point value, but also receives the operating point shift value from the EMS 50. The PMS 40 uses the operating point shift value to compute an increment or decrease amend of an operating point when an actual value of a forecast variable deviates from the forecast variable value that has previously been used by the EMS 50.

Figure 4:
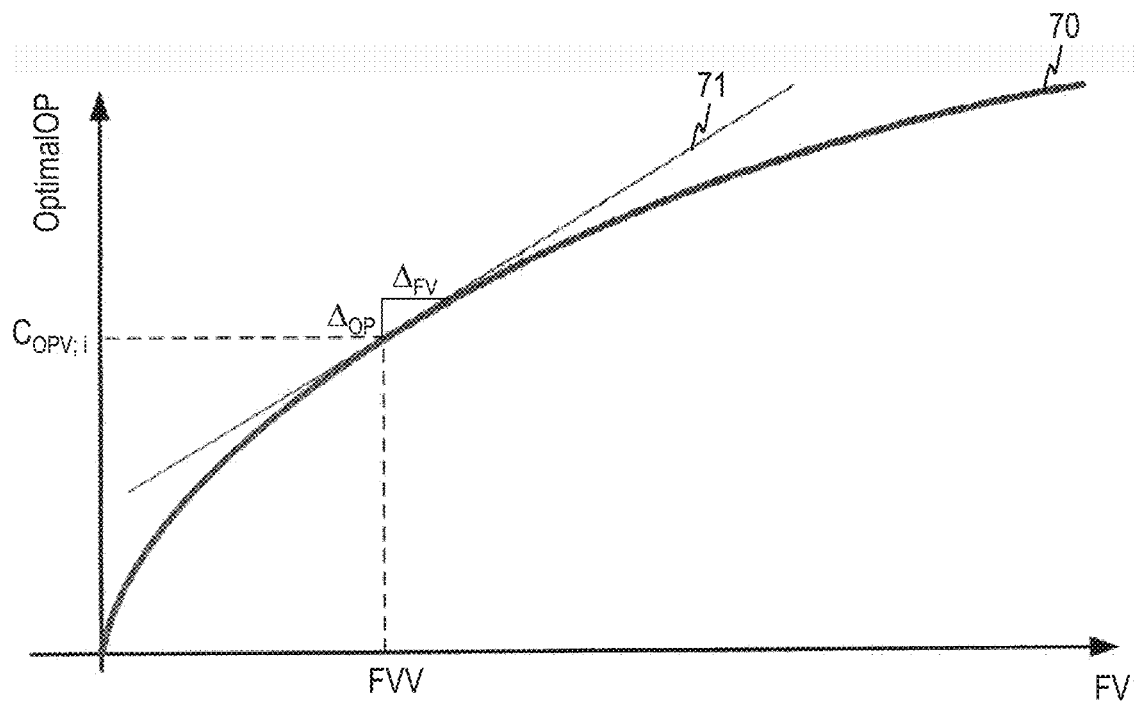
FIG. 4 illustrates operation of an energy management system of a microgrid.

Referring to FIG. 4, there is showing an exemplary graph 70 that represents the optimal operating point value $C_{OPV,i}$ for an asset i of the microgrid as a function of a forecast variable value.

The EMS 50 performs an optimization routine to determine the operating point value $C_{OPV,i}$ that is optimal for a controllable asset of the microgrid for a retrieved forecast variable value FVV.

Additionally, the EMS 50 determines an operating point shift value $K_{op,i}$ that indicates by which increment or decrement $\Delta_{OP}$ the optimal operating point value of the controllable asset changes in response to a variation $\Delta_{FV}$ in forecast variable around the retrieved forecast variable value FVV.

The operating point shift value may be regarded to be the slope of a tangent 71 to the function 70 that represents the optimal operating point for an asset as a function of the forecast variable. I.e., the operating point shift value may be determined as $$K_{OP,i} = \frac{dC_{OPV,i}(FVV)}{d\ FVV}, \quad (2)$$

with the derivative being evaluated at the retrieved forecast variable value.

The functional dependency of the optimal operating point value on the forecast variable value may not always be explicitly known. Therefore, the operating point shift value may also be computed as a discrete derivative, using, e.g., one of the following equations:

$$K_{OP,i} = \frac{C_{OPV,i}(FVV + \Delta FV) - C_{OPV,i}(FVV)}{\Delta FV} \quad (3)$$

$$K_{OP,i} = \frac{C_{OPV,i}(FV) - C_{OPV,i}(FVV - \Delta FV)}{\Delta FV} \quad (4)$$

$$K_{OP,i} = \frac{C_{OPV,i}(FVV + \Delta FV/2) - C_{OPV,i}(FVV - \Delta FV/2)}{\Delta FV} \quad (5)$$

The optimal operating point values in the numerator on the right-hand sides of these equations may each be determined by the EMS 50 executing its conventional optimization routine. The discrete variation $\Delta FV$ used to calculate the discrete derivative may be a fixed value that may be dependent on the respective forecast variable. The discrete variation $\Delta FV$ used to calculate the discrete derivative may also be a fixed fraction of the retrieved forecast variable value FVV.

Figure 5:
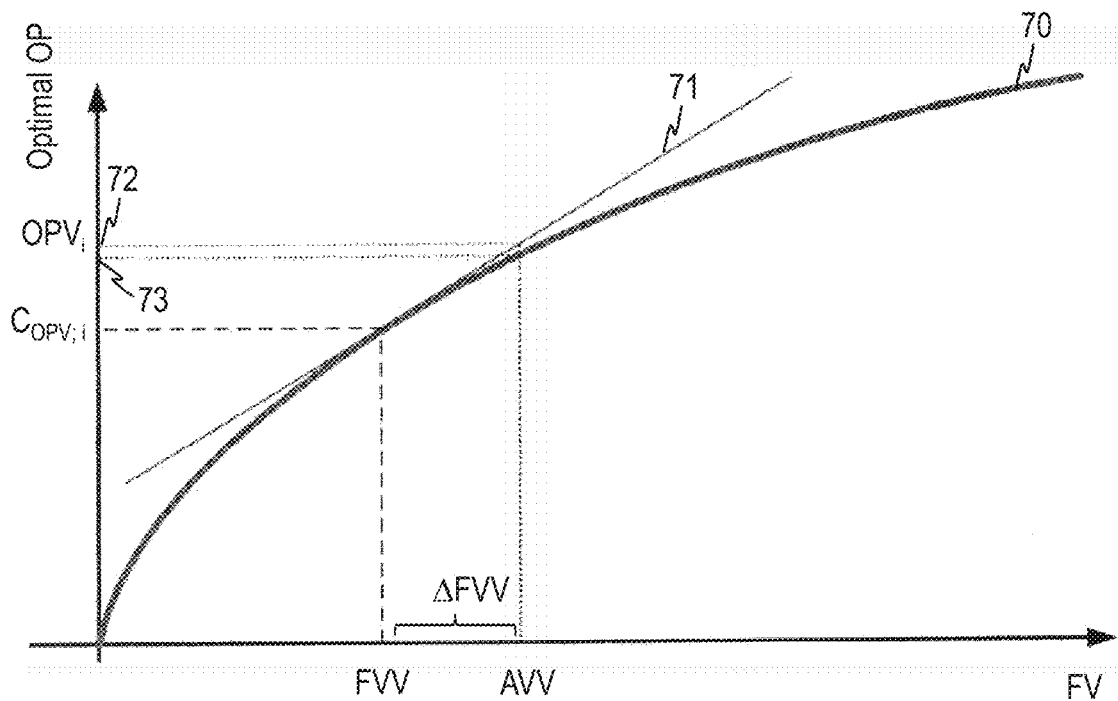
FIG. 5 illustrates operation of a power management system of a microgrid.

FIG. 5 illustrates how the PMS 40 may use the operating point shift value to update the optimal operating point value $C_{OPV,i}$ received from the EMS 50. Such an update may be continually performed or may be selectively performed if a deviation of an actual value of the forecast variable (such as an actual load in the microgrid) from the forecast variable value (such as a forecast load in the microgrid) is detected. Continually performing the update, independently of whether the actual value of the forecast variable is actually different from the forecast variable value used by the EMS 50, provides enhanced robustness. The updating is implemented in such a way that the updated operating point value will automatically coincide with the received operating point value if the actual value of the forecast variable coincides with the forecast variable value used by the EMS 50.

The PMS 40 may increment or decrement the operating point value $C_{OPV,i}$ received from the EMS 50 by an amount that is dependent on the operating point shift value $K_{OP,i}$ for the respective asset and a difference $\Delta FVV$ between an actual value of the forecast variable, AVV, and the forecast variable value FVV that has been used by the EMS to determine the operating point value.

For illustration, the PMS 40 may compute an updated operating point value for the respective asset i in accordance with:

$$OPV_i = C_{OPV,i} + K_{OP,i} \times \Delta FVV \quad (6)$$

In equation (6), $\Delta FVV = AVV - FVV$.

In contrast to conventional control systems, the EMS 50 may also provide the forecast variable value FVV to the PMS 40, in order to allow the PMS 40 to update the operating point value in dependence on both the operating point shift value and the difference $\Delta FVV$ between an actual value of the forecast variable, AVV, and the forecast variable value FVV that has been used by the EMS to determine the operating point value.

Figure 6:
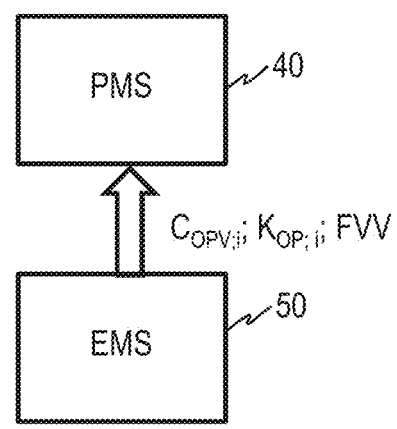
FIG. 6 is a schematic block diagram of control systems of a microgrid.

FIG. 6 is a schematic block diagram representation of a control system of a microgrid that comprises the PMS 40 and the EMS 50. As schematically illustrated in FIG. 6, the EMS 50 does not only provide the operating point value $C_{OPV,i}$ that has been determined to be optimum for an asset i, but also the operating point shift value $K_{OP,i}$ and the forecast variable value FVV that has been used by the EMS 50 when performing the optimization routine.

While reference has been made to an individual assets above, the operating point value $C_{OPV,i}$ that has been determined to be optimum for an asset i and the operating point shift value $K_{OP,i}$ will typically be computed for several controllable assets, in particular several controllable power-generating assets and/or controllable loads of the microgrid 10.

For illustration and without limitation, the operating point value for generators or ESS may respectively be power setpoints. The associated operating point shift values may indicate by how much the power setpoint of each generator or ESS changes in response to a small variation of the forecast variable around the retrieved forecast variable value that has been used by the EMS 50 in the optimization routine.

For further illustration and without limitation, the operating point value for renewable energy sources may respectively be power limits. The associated operating point shift values may indicate by how much the power limit of each renewable energy source changes in response to a small variation of the forecast variable around the retrieved forecast variable value that has been used by the EMS 50 in the optimization routine.

When operating point shift values are determined not only for one, but for several assets of the microgrid, a constraint may be enforced on the sum of the operating point shift values. In particular, the operating point shift values may be normalized in such a way that $$\Sigma_i K_{OP,i} = 1 \quad (7)$$

While this constraint is normally automatically respected when the operating point shift values are calculated based on known explicit functional dependencies in accordance with equation (2), this constraint may not be automatically respected due to discretization errors when discrete derivatives are used in accordance with one of equations (3) to (5).

In this case, the discrete derivatives may first be calculated in accordance with one of equations (3) to (5) and may subsequently be normalized (using the same normalization constant for each of the discrete derivatives determined in accordance with one of equations (3) to (5)) in such a way that the constraint according to equation (7) is fulfilled.

While reference has so far been made to a single forecast variable, the EMS 50 may use more than one forecast variable in the optimization routine that determines the optimal operating point values. For illustration, 2, 3, 4 or more than 4 forecast variables may be used.

When more than one forecast variable is used, the techniques described above generally still remain applicable. However, more than one operating point shift value will typically have to be calculated. For illustration, in order to accommodate possible deviations of more than one forecast variable from the associated forecast variable value used by the EMS 50, a gradient (i.e., a multidimensional derivative) will have to be calculated in the parameter space spanned by several forecast variables.

Figure 7:
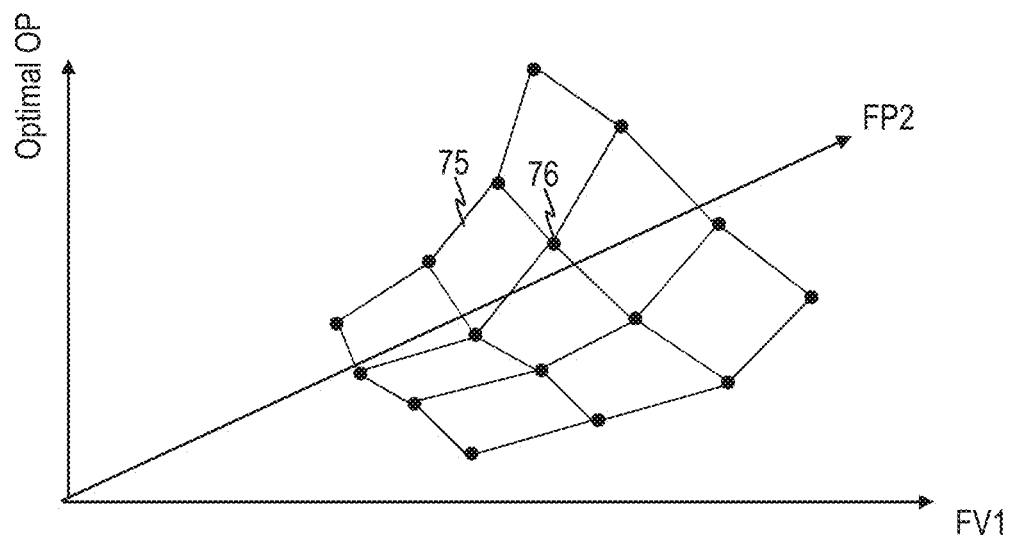
FIG. 7 illustrates a modification of the techniques explained with reference to FIGS. 5 and 6 for a multidimensional forecast variable space.

This is schematically illustrated in FIG. 7 for two forecast variables FV1 and FV2. The optimal operating point is a function of the parameter values retrieved for the two forecast variables FV1 and FV2. The optimal operating points as a function of FV1 and FV2 may be represented as a surface 75 in the parameter space spanned by FV1 and FV2.

When the optimal operating point determined by the EMS 50 for a set of retrieved forecast variable values for the two forecast variables FV1 and FV2 is a point 76 on the surface 75, the operating point shift values are determined by the inclination of a tangential line or plane to the surface 75 at point 76 along the axes defined by the forecast variables FV1 and FV2.

On a mathematical level, when M forecast variables are taken into consideration by the EMS 50 in an optimization routine, which are labelled j=1 . . . M, a total number M of operating point shift values may be calculated by the EMS 50 for each asset i as partial derivatives in accordance with $$K_{OP,i,j} = \frac{\partial C_{OPV,i}(FVV_1, FVV_2, \ldots, FVV_j, \ldots, FVV_M)}{\partial FVV_j} \quad (8)$$

The partial derivatives are respectively evaluated at the values for the M forecast variable that correspond to the M retrieved forecast variable values.

It will be appreciated that, as has been explained with reference to equations (3) to (5), the operating point shift values may also be calculated as a discrete derivatives. For illustration, the operating point shift values may be calculated according to $$K_{OP,i,j} = \frac{C_{OPV,i}(FVV_1, FVV_2, \ldots, FVV_j + \Delta FVV_j, \ldots, FVV_M) - C_{OPV,i}(FVV_1, FVV_2, \ldots, FVV_j, \ldots, FVV_M)}{\Delta FVV_j} \quad (9)$$

The other discrete derivatives explained with reference to equations (4) and (5) may also be used.

When more than one forecast variable value has been used by the EMS 50, that is susceptible to being incorrect, the PMS 40 may use the several operating point shift values to determine an updated operating point value. For illustration, the updated operating point value in accordance with:

$$OPV_i = C_{OPV,i} + \Sigma_{j=1}^M K_{OP,i,j} \times \Delta FVV_j \quad (10)$$

Figure 8:
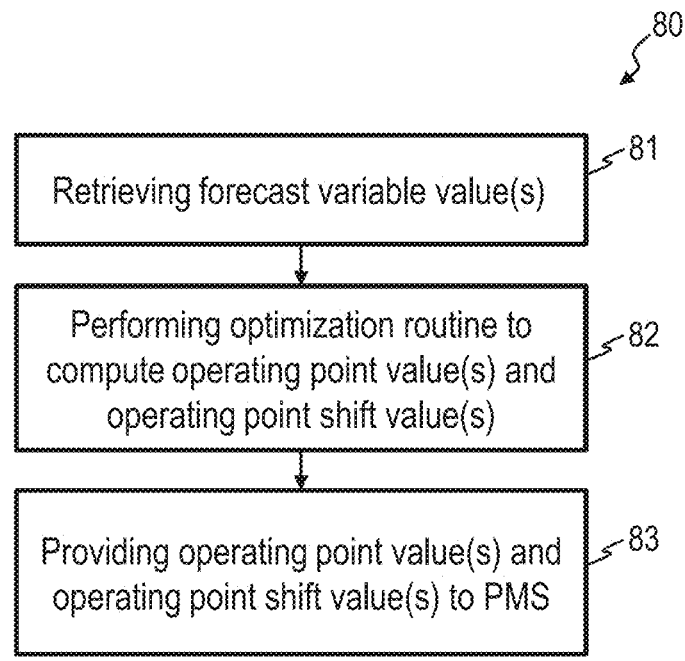
FIG. 8 is a flow chart of a method performed by an energy management system of a microgrid.

FIG. 8 is a flow chart of a method 80 according to an embodiment. The method 80 may be performed by the EMS 50 according to an embodiment.

At step 81, the EMS 50 may retrieve one or several forecast variable values from one or several forecast servers.

At step 82, the EMS 50 may execute an optimization routine to compute an operating point value and an operating point shift value for one or several assets of the microgrid 10. The operating point value and an operating point shift value may be computed for all controllable assets in the microgrid. Implementations of the optimization routine are known to the skilled person and will not be described in further detail herein. The operating point shift value may be computed using any one of the techniques described above.

At step 83, the EMS 50 may provide the operating point value and the operating point shift value for one or several assets of the microgrid 10 to the PMS 40. The EMS 50 may optionally also provide information on the one or several forecast variable values that have been used for determining the optimal operating point values to the PMS 40.

Figure 9:
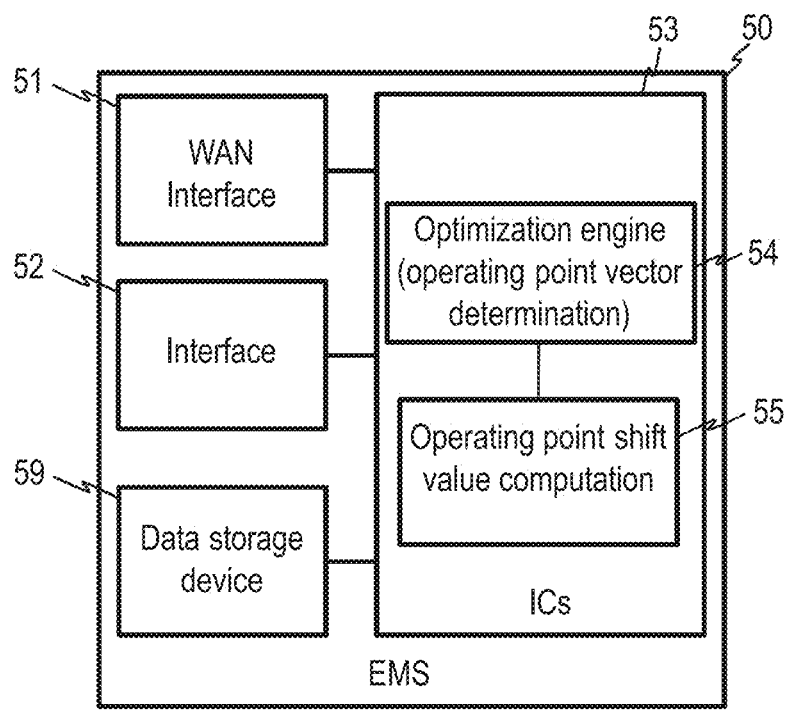
FIG. 9 is a block diagram of an energy management system of a microgrid.

FIG. 9 is a block diagram of an EMS 50 according to an embodiment. The EMS 50 may comprise a wide area network (WAN) interface 51 or another interface to retrieve forecast variable values, e.g., over a wide area network 60. The EMS 50 may communicate with the PMS 40 over the WAN interface 51 or may have a dedicated interface 52 for communication with the PMS, e.g., for ensuring high bandwidth between the PMS 40 and the EMS 50. The EMS 50 may comprise a data storage device 59 that stores past and present data of the microgrid 10.

The EMS 50 includes one or several integrated semiconductor circuits 53. The integrated semiconductor circuits 53 may be implemented as processors, microprocessors, controllers, microcontrollers, application specific integrated circuits (ASICs), or combinations thereof. As will be explained in more detail below, the EMS 50 may comprise a plurality of parallel processors that are operative to compute a plurality of operating point vectors in parallel.

The integrated semiconductor circuit(s) 53 may be configured by use of suitable hardware, firmware, or software to execute an optimization routine 54. The optimization routine may be operative to determine the operating point values for controllable assets in the microgrid 10 so as to find the maximum or minimum of a target function. The target function may be indicative of fuel consumption, $CO_2$ emission, overall revenue, or another metric. Implementations of the optimization routine performed by the EMS 50 are known to the skilled person and will not further be described herein.

The integrated semiconductor circuits 53 may be configured by use of suitable hardware, firmware, or software to perform an operating point value shift computation 55. The module 55 may be operative to determine the operating point shift value using any one of the techniques described above. If the operating point shift value is computed based on discrete derivatives, as explained with reference to equations (3) to (5) and (9), the module 55 may cause the optimization routine 53 to be executed several times. The module 55 may determine a variation of the forecast variable around the retrieved forecast variable value for one or several of the additional optimization routine executions, in order to determine the operating point shift value in accordance with one of equations (3) to (5) and (9) or as another implementation of a discrete derivative.

Figure 10:
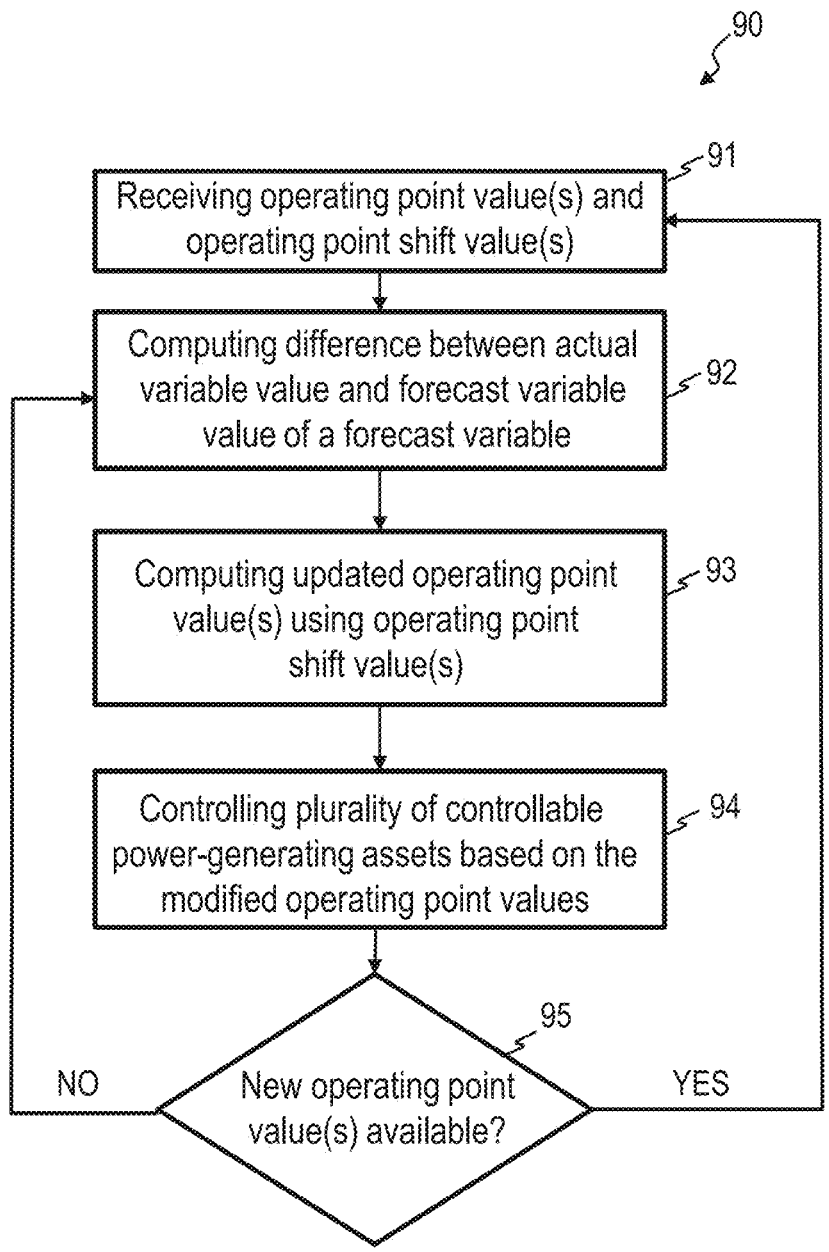
FIG. 10 is a flow chart of a method performed by a power management system of a microgrid.

FIG. 10 is a flow chart of a method 90 according to an embodiment. The method 90 may be performed by the PMS 40 according to an embodiment.

At step 91, operating point values for one or several controllable power-generating assets in the microgrid may be received. The operating point values may be received from the EMS 50. The operating point values may form, in combination, an operating point vector. Additionally, operating point shift values for one or several controllable power-generating assets in the microgrid may be received. The operating point shift values may be received from the EMS 50. The operating point shift values may be used by the PMS 40 to update the operating point values included in the operating point vector. The operating point vector and operating point shift values may be received concurrently, i.e., in the same message or set of messages, from the EMS 50.

At step 92, the PMS 40 may compute a difference between an actual value of a forecast variable (such as an actual value of the forecast variable "load at 3:00 PM") and the forecast variable value that has been used by the EMS 50 (such as the forecast variable value for "load at 3:00 PM" that was used at an earlier time by the EMS 50). The forecast variable value that has been used by the EMS 50 may also be received from the EMS 50.

At step 93, the PMS 40 may compute an updated operating point value for one or several assets in the microgrid. This may comprise incrementing or decrementing the operating point value received from the EMS 50. The increment or decrement may be dependent on the operating point shift value for the respective asset and the difference computed at step 92. The updated operating point value may be computed using any one of the techniques disclosed above.

At step 94, the plurality of controllable assets in the microgrid may be controlled based on the updated operating point values. For illustration, generators or ESSs may be controlled to provide power in accordance with an updated power setpoint that corresponds to the updated operating point value. Wind turbines, photovoltaic modules, or other RES may be controlled to provide power in accordance with an updated power limit that corresponds to an updated operating point value. Controllable loads may be controlled to consume power in accordance with updated load power setpoints.

At step 95, a determination is made whether a new operating point vector can be expected from the EMS 50. For illustration, the EMS 50 may provide new operating point vectors at regular time intervals, such as every 5, 10, or 15 minutes. If no new operating point values are available, the method may return to step 92. Steps 92-95 may be performed more frequently than the interval at which the EMS 50 provides new operating point values, e.g., with a repetition interval that is less than 15 minutes, in particular less than 5 minutes. If new operating point values are available, the method may return to step 91.

Figure 11:
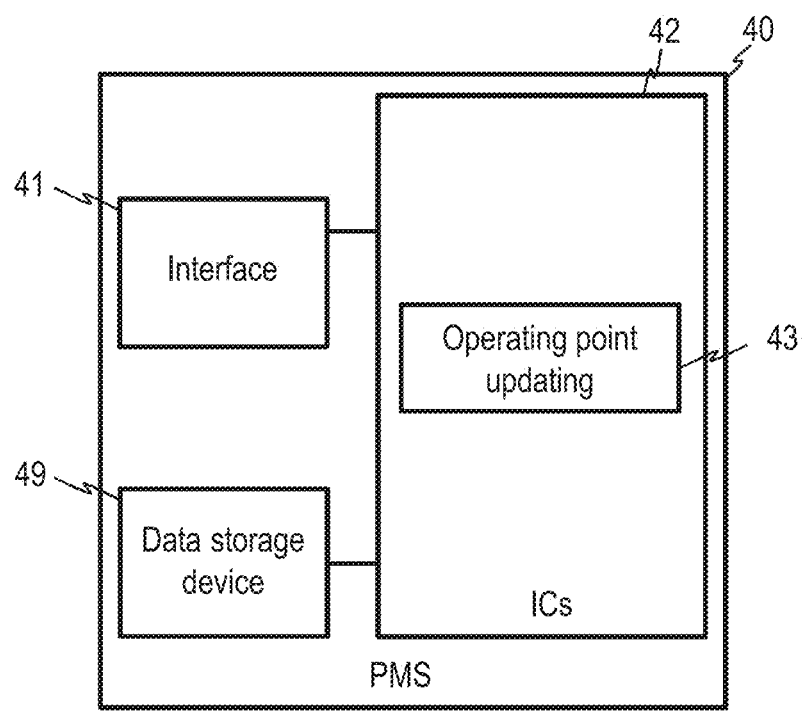
FIG. 11 is a block diagram of a power management system of a microgrid.

FIG. 11 is a schematic block diagram of a PMS 40 according to an embodiment. The PMS 40 has an interface 41 operative to receive an operating point vector and operating point shift values from the EMS 50. The PMS 40 may include a data storage device 49 for storing locally available present or past data relating to the operation of the microgrid 10.

The PMS 40 includes one or several integrated semiconductor circuits 42. The integrated semiconductor circuits 42 may be implemented as processors, microprocessors, controllers, microcontrollers, application specific integrated circuits (ASICs), or combinations thereof.

The one or several integrated semiconductor circuits 42 may be configured, using suitable hardware, firmware, or software, to execute an operating point updating module 43. The operating point updating module 43 may be operative to increment or decrement the operating point value received from the EMS 50 by an amount that is dependent on the operating point shift value. The increment or decrement may have a magnitude that is equal to the operating point shift value multiplied by the difference between the actual value of a forecast variable and the forecast variable value that has been used by the EMS 50, as has been explained above.

The one or several integrated semiconductor circuits 42 may be operative to provide the updated operating point values to the controllable power-generating assets, e.g., via interface 41, or to otherwise control operation of the controllable power-generating assets that are online based on the updated operating point values.

While updated operating point values may be suboptimal, a new operating point vector will be provided by the EMS 50 in regular intervals. Therefore, operating in a suboptimal regime for a short time interval between receipt of two successive operating point vectors from the EMS 50 may be tolerable. The suboptimal operating points are derived from pre-computed optimal operating points, and are typically assumed to be reasonably close to optimal.

For any forecast variable value or set of forecast variable values, the EMS 50 may compute more than one operating point vector. For illustration, the EMS 50 may compute a plurality of operating point vectors that reflect hypothetical variations of the forecast variable around the forecast variable values that have been retrieved from the EMS 50 via the wide area network 60.

In this case, the EMS 50 may also compute associated operating point shift values for each one of the plurality of operating point vectors.

The PMS 40 may select one of the operating point vectors based on actual value(s) of the forecast variable(s). The PMS may update the operating point values included in that selected operating point vector based on the operating point shift value and a difference between the actual variable value of the forecast variable and the forecast variable value associated with the selected operating point vector.

This will be explained in more detail with reference to FIGS. 12 to 19.

According to the techniques that will be described in detail with reference to FIGS. 12 to 19, the EMS 50 calculates one operating point vector that corresponds to the retrieved forecast variable values and several additional operating point vectors, so as to generate a plurality of operating point vectors that are provided to the PMS 40 in each periodic cycle of EMS operation. The several additional operating point vectors are not the optimal solution for the retrieved forecast variable values, but account for hypothetical variations around the retrieved forecast variable values.

Various techniques can be used to generate the modified forecast variable values by the EMS 50 such that the modified forecast variables differ from the retrieved forecast variable values.

One or several of the modified forecast variable values for which an additional operating point vector is determined may be dependent on the retrieved forecast variable value, this is not required. For illustration, alternatively or additionally, one or several of the modified forecast variable values for which an additional operating point vector is determined may be determined so as to be independent of any one of the retrieved forecast variable value. One or several of the modified forecast variable values may have default values and/or values generated in accordance with a random distribution. This may be particularly suitable if a forecast variable value cannot be retrieved at the time at which the operating point vector is calculated (e.g., because the associated forecast server is down), but a statistical distribution for the forecast variable value is available based on, e.g., historical data stored in the EMS or elsewhere.

Figure 12:
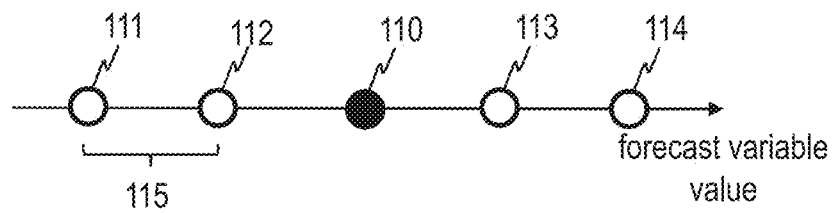
FIG. 12 to FIG. 15 are schematic representations illustrating operation of an energy management system of a microgrid.

For illustration, as illustrated in FIG. 12, a plurality of modified forecast variable values 111, 112, 113, 114 may be generated that are distributed around the retrieved forecast variable value 110. The modified forecast variable values and the retrieved forecast variable value may be linearly distributed, as illustrated in FIG. 12. The spacing 115 between adjacent variable values may have a fixed absolute value or may be a fixed percentage of the retrieved forecast variable value 110.

Figure 13:
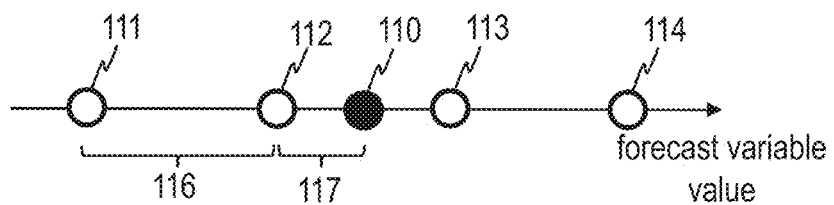

For further illustration, as illustrated in FIG. 13, a plurality of modified forecast variable values 111, 112, 113, 114 may be generated that are distributed around the retrieved forecast variable value 110. The modified forecast variable values and the retrieved forecast variable value may be non-linearly distributed, as illustrated in FIG. 13. I.e., a spacing 116 between a first pair of adjacent variable values 111, 112 is different from a spacing 117 between a second pair of adjacent variable values 112, 110 for which an operating point vector is computed. Each spacing 116, 117 between adjacent variable values may have a fixed absolute value. Each spacing 116, 117 between adjacent variable values may be a fixed percentage of the retrieved forecast variable value 110, or the spacing 117 may be a fixed percentage of the spacing 117, with the spacing 117 being either a fixed absolute value or a given percentage of the retrieved variable value 110, or vice versa.

The spacing may increase in a direction away from the retrieved parameter value 110, as illustrated in FIG. 13, to account for the fact that large deviations from the retrieved forecast variable value may become increasingly less likely.

Alternatively, the spacing may decrease in a direction away from the retrieved parameter value 110, to account for the fact that large deviations from the retrieved forecast variable value may entail an increasing demand for the provision of truly optimal operating parameter vectors.

The modified forecast variable values may, but do not always need to be determined based on the retrieved forecast variable value, as has been explained above.

Operating point shift values may be determined not only for the retrieved forecast variable value 110, but also for one or several of the modified forecast variable values 111, 112, 113, 114.

Figure 14:
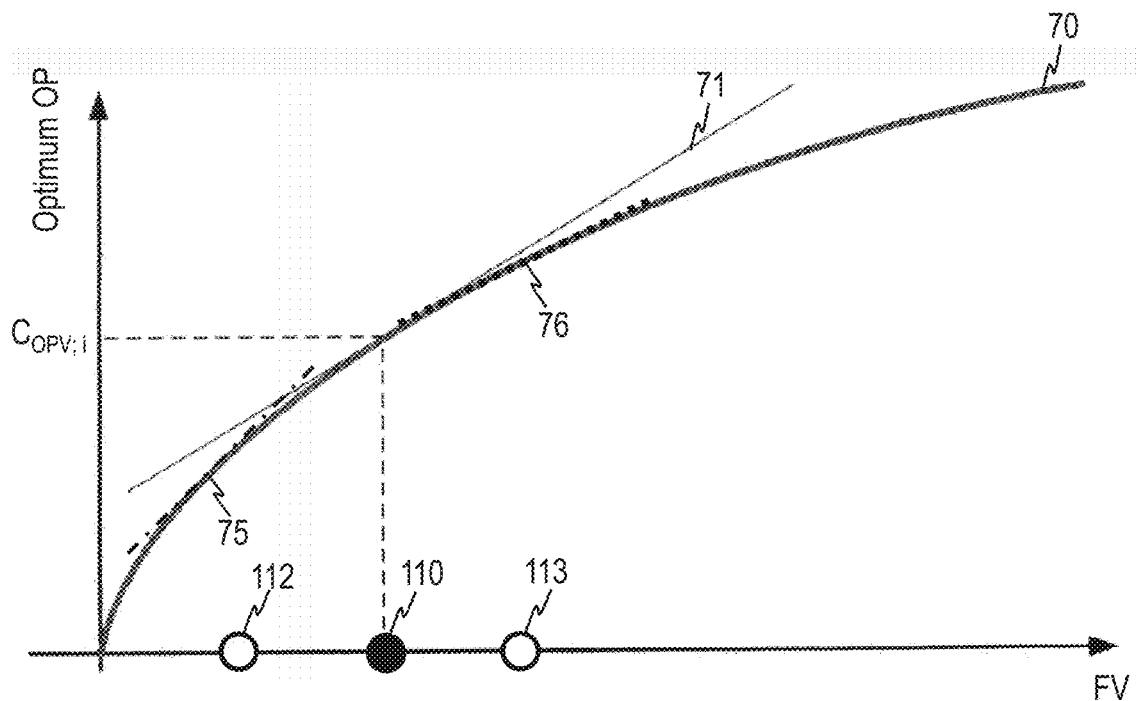

FIG. 14 illustrates the determination of several operating point shift values that correspond to a plurality of forecast variable values 112, 110, 113 for the same forecast variable. Forecast variable value 110 corresponds to the retrieved forecast variable value. Forecast variable values 112, 113 are artificial values generated by the EMS 50.

As has been explained above, an operating point shift value for forecast variable value 110 may be determined as a slope of a tangential line 71 to the curve 70 at the forecast variable value 110.

An operating point shift value for forecast variable value 112 may be determined as a slope of a tangential line 75 to the curve 70 at the forecast variable value 112.

An operating point shift value for forecast variable value 113 may be determined as a slope of a tangential line 75 to the curve 70 at the forecast variable value 113.

All the operating point shift values that correspond to the different slopes or gradients determined for the retrieved forecast variable value 110 and the several additional forecast variable values 112, 113 artificially generated by the EMS 50 may be provided to the PMS 40. This may be done in each cycle of EMS operation.

While a one-dimensional array of parameter values is schematically illustrated in FIGS. 12 and 13, several forecast variables (such as 2, 3, 4 or more than 4 forecast variables) may be used by the EMS 50. In this case, modified forecast variable values may be defined in a higher-dimensional forecast variable space.

Figure 15:
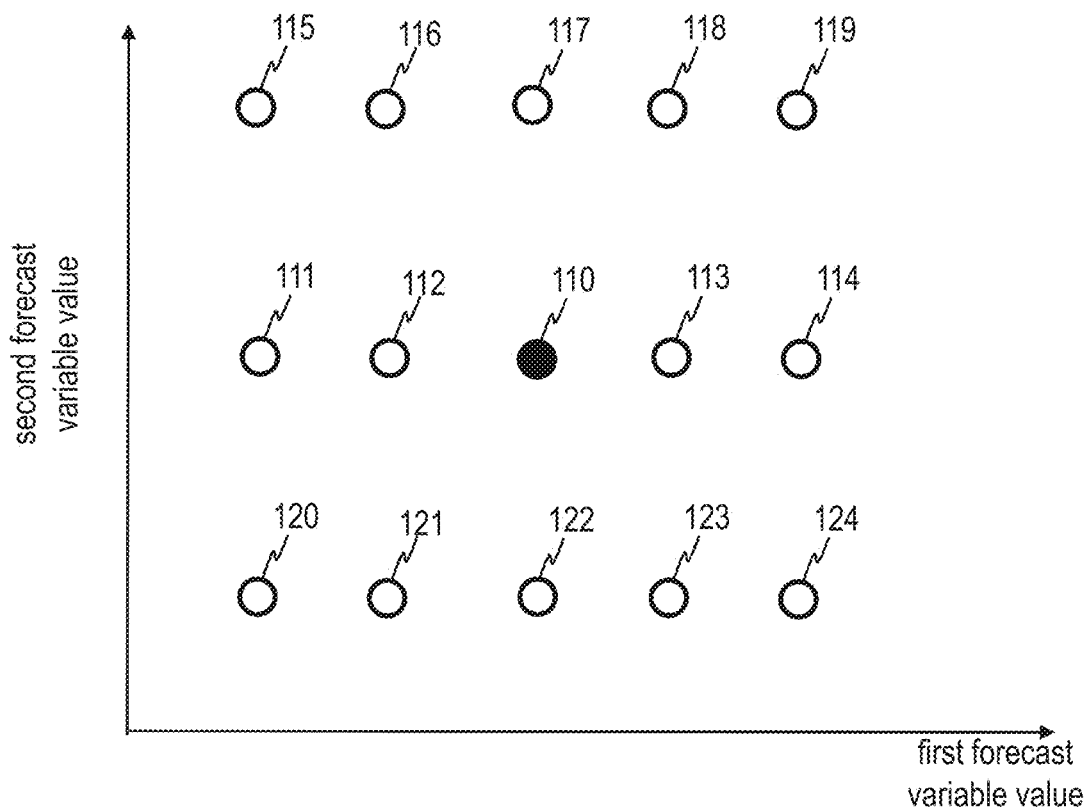

FIG. 15 is a schematic representation illustrating the generation of modified forecast variable values around a retrieved 2-tuple of forecast variable values 110. Modified 2-tuples of forecast variable values 111-124 may be arranged in a regular arrangement around the retrieved forecast variable values. The spacing between adjacent columns and rows of the modified forecast variable values may, but do not need to be the same.

As has been described with reference to FIG. 12 and FIG. 13, the spacing between adjacent modified variable values may be defined by absolute numbers or as a percentage, e.g., a percentage of the first and second retrieved variable values of the 2-tuple 110.

As has been described above, the modified forecast variable values do not need to be regularly distributed. Rather, nonlinear distributions and arrangements of modified forecast variable values may be used.

While a 2-dimensional array of modified forecast variable values as illustrated in FIG. 15, the above principles are similarly applicable to the case where more than two forecast variables are used by the EMS 50.

Figure 16:
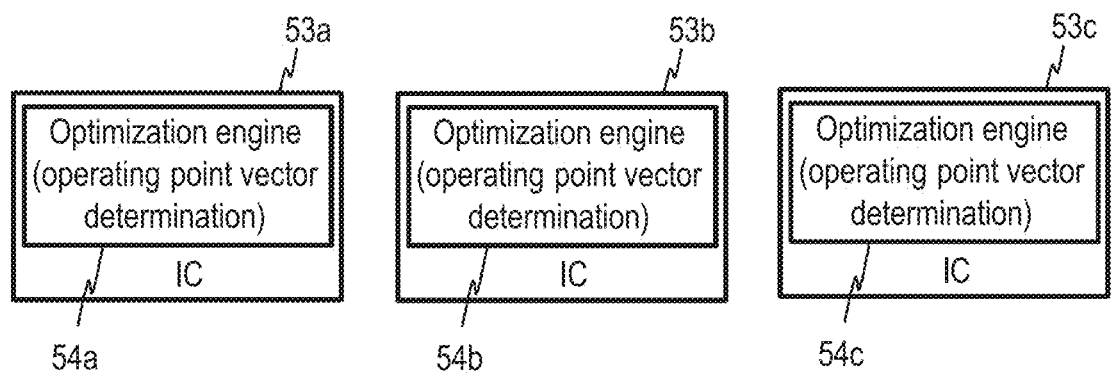
FIG. 16 is a block diagram of parts of an energy management system of a microgrid.

The present technique is particularly amenable to parallel computing. This is illustrated in FIG. 16. FIG. 16 shows an arrangement of several parallel integrated circuits, which may be parallel processors 53a, 53b, 53c. Each of the parallel processors 53a, 53b, 53c may execute its own instance of the optimization routine 54a, 54b, 54c.

One of the integrated circuits, such as processor 53a, may compute the operating point vector for forecast variable values that are equal to the parameter values retrieved from the forecast servers. One or several additional integrated circuits, such as processors 53b, 53c, may compute the operating point vectors for modified forecast variable values that are deliberately varied around the retrieved forecast variable values by the EMS 50.

Similarly, the computation of associated operating point shift values may be distributed among several integrated circuits.

The total number of modified forecast variable values, and thus the total number of operating point vectors that is computed by the EMS 50 and provided to the PMS 40 in each cycle of EMS operation, may be dynamically adjusted. The total number of operating point vectors may be adjusted based on a computation load of the EMS 50 and/or available communication bandwidth between the EMS 50 and the PMS 40.

The set of all operating point vectors that includes the operating point vectors for the retrieved forecast variable values and the several additional operating point vectors for the modified forecast variable values that have been generated by the EMS 50 may be concurrently transmitted by the EMS 50 to the PMS 40. The retrieved forecast variable values may also be transmitted by the EMS 50 to the PMS 40. The modified forecast variable values may be transmitted by the EMS 50 to the PMS 40. However, the modified forecast variable values may not need to be transmitted by the EMS 50 to the PMS 40, e.g., when the PMS 40 has knowledge of the rules used by the EMS 50 to compute the modified forecast variable values.

Figure 17:
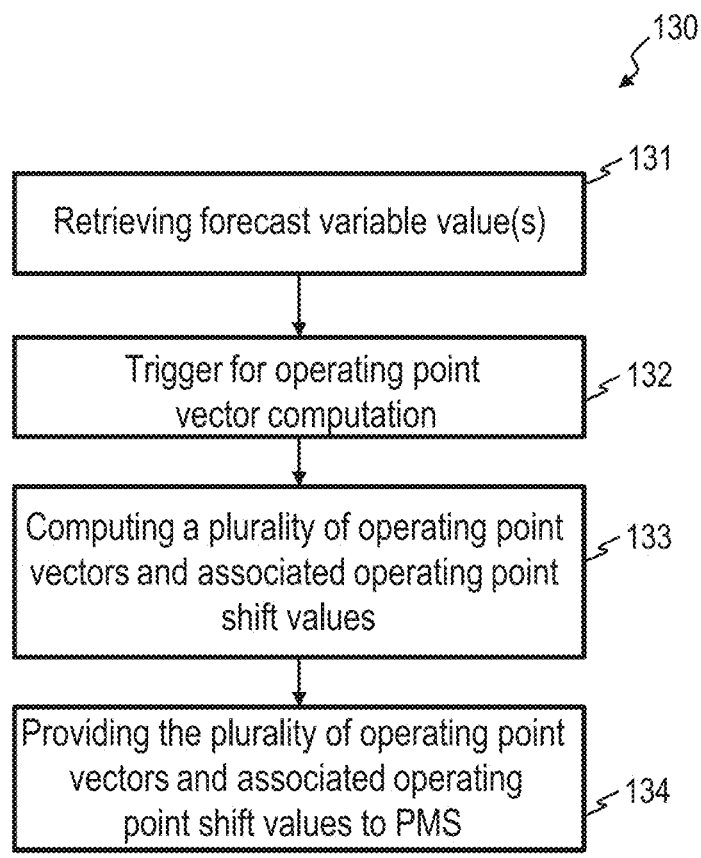
FIG. 17 is a flow chart of a method performed by an energy management system of a microgrid.

FIG. 17 is a flow chart of a method 130 according to an embodiment. The method 130 may be performed by the EMS 50.

At step 131, forecast variable values are retrieved for one or several forecast variables. Retrieval of the forecast variable values may be triggered in repeated time intervals, e.g. at a predefined time interval before the computation of the operating point vector is started.

At step 132, the computation of the operating point vector may be triggered. The trigger event may be expiry of a timer, such that a new plurality of operating point vectors is computed in particular time intervals, e.g. every 5 minutes, every 10 minutes, or every 15 minutes.

At step 133, a plurality of operating point vectors is computed. One of the operating point vectors corresponds to the forecast variable value(s) for one or several forecast variables that have been retrieved from forecast servers at step 131. The several additional operating point vectors represent the optimal solution for forecast variables that are different from and vary about the forecast variable values for one or several forecast variables that have been retrieved from forecast servers at step 131.

Associated operating point shift values are also computed. The computation of the operating point shift values may be performed using any one of the techniques disclosed above. In essence, the operating point shift values are equal to or proportional to the slope of tangential lines of a curve or surface that represents the optimal operating point value as a function of one or several forecast variable values. The operating point shift values correspond to derivatives or partial derivatives of the function that represents the optimal operating point value as a function of one or several forecast variable values.

At step 134, the plurality of operating point vectors and the associated operating point shift values may be provided to the PMS 40. The plurality of operating point values and associated operating point shift values may be provided concurrently to the PMS 40. Information on the forecast variable values and, optionally, the modified forecast variable values that have been used for each of the operating point vectors may also be provided to the PMS 40.

The PMS 40 may use the plurality of operating point vectors and associated operating point shift values in various ways. For illustration, the PMS 40 may select the one of the plurality of operating point vectors for which the actual forecast variable value is closest to the forecast variable value that had been used by the EMS 50 in its optimization computation.

The PMS 40 may then use the associated operating point shift value to compensate for any remaining difference between the actual value of the forecast variable and the forecast variable value that is closest to the actual value.

Figure 18:
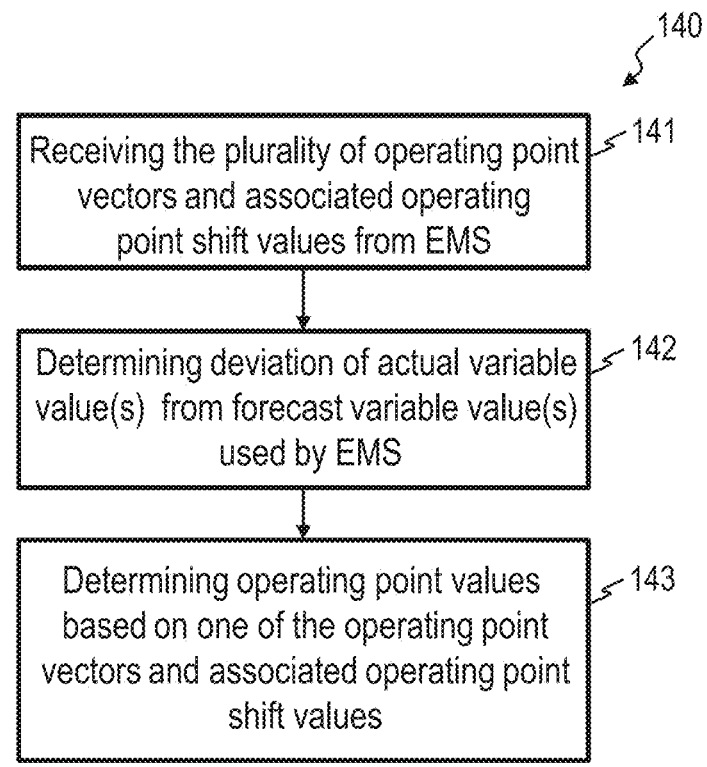
FIG. 18 is a flow chart of a method performed by a power management system of a microgrid.

FIG. 18 is a flow chart of a method 140 according to an embodiment. The method 140 may be performed by the PMS 40.

At step 141, the PMS 40 receives a plurality of operating point vectors and associated operating point shift values from the EMS 50. The plurality of operating point vectors and an associated operating point shift values may be generated by the EMS 50 using the techniques explained above.

At step 142, the PMS 40 may determine that one or several actual values of forecast variables (such as the actual load that is locally available in the microgrid) is/are different from the forecast variable values that have been used by a EMS 50. For illustration, a power offset may be detected.

At step 143, the PMS 40 may determine operating point values for a plurality of controllable assets in the microgrid 10 using the plurality of operating point vectors and at least one of the operating point shift values. This may comprise selecting one of the operating point vectors based on an actual variable value of the forecast variable. The operating point values included in the selected operating point vector may be updated using the associated operating point shift values and the difference between the actual variable value of the forecast variable and the forecast variable value associated with the selected operating point vector.

Figure 19:
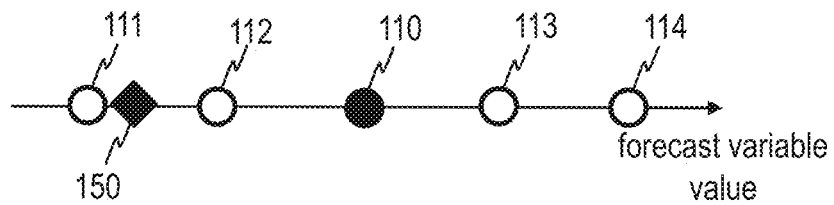
FIG. 19 is schematic representation illustrating operation of a power management system of a microgrid.

FIG. 19 illustrates operation of the PMS 40. If an actual value 150 of a forecast variable (such as the actual load in the microgrid) deviates from the forecast variable value 110, the PMS 40 may determine operating point values based on one or several of the additional operating point vectors that have been determined for the modified forecast variable values 111, 112. For illustration, if the actual value 150 of the forecast variable is closest to the modified forecast variable value 111, the operating point value associated with the modified forecast variable value 111 may be used as a starting point by the PMS 40 for its control.

If the actual value 150 does not fully coincide with the closest modified forecast variable value 111, the PMS 40 may use the operating point shift value associated with the modified forecast variable value 111 to calculate an updated operating point value, in which the operating point value included in the operating point vector for forecast variable value 111 is incremented or decremented based on the operating point shift value, as has been explained above.

While the invention has been described in detail in the drawings and foregoing description, such description is to be considered illustrative or exemplary and not restrictive. Variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

The invention claimed is:

1. A method of controlling a microgrid including a plurality of controllable assets, the method comprising:
retrieving, by an energy management systems, EMS, a forecast variable value for a forecast variable;
determining, by the EMS, an operating point value for a controllable asset that depends on the retrieved forecast variable value, the operating point value being a function of the forecast variable value;
determining, by the EMS, an operating point shift value for the controllable asset, the operating point shift value representing a shift in operating point value in response to a variation in forecast variable value, and the operating point shift value being dependent on a derivative of the function that represents the operating point value in dependence on the forecast variable value;
providing the operating point value and the operating point shift value to a power management system, PMS, of the microgrid;
determining, by the PMS, an updated operating point value for the controllable asset in dependence on the operating point value for the controllable asset, the operating point shift value for the controllable asset, and a difference between an actual value of the forecast variable and the forecast variable value for the forecast variable; and
controlling, by the PMS, the controllable asset based on the updated operating point value.

2. The method of claim 1, further comprising:
retrieving, by the EMS, plural forecast variable values for plural forecast variables,
determining, by the EMS, plural operating point shift values that are indicative of shifts in operating point value in response to variations of the plural forecast variable values, and
providing, by the EMS, the operating point value and the plural operating point shift values to the PMS.

3. The method of claim 2, further comprising determining, by the EMS, the operating point value and the operating point shift value for each one of the plurality of controllable assets.

4. The method of claim 3, wherein determining the operating point shift values for the plurality of controllable assets comprises enforcing a constraint on a sum of the operating point shift values.

5. The method of claim 1, further comprising:
determining, by the EMS, several additional operating point values and several additional operating point shift values for modified forecast variable values that deviate from the retrieved forecast variable value; and
providing, by the EMS, the several additional operating point values and several additional operating point shift values to the PMS.

6. The method of claim 5, wherein the modified forecast variable values deviate from the retrieved forecast variable value by pre-defined percentages or by pre-defined absolute differences.

7. The method of claim 1, further comprising receiving, by the PMS for each one of several controllable assets of the microgrid, an associated operating point value and an associated operating point shift value and determines an updated operating point value for each one of the several controllable assets based thereon.

8. The method of claim 1, further comprising determining, by the PMS, the updated operating point value in accordance with $$OPV = C_{OPV} + K_{OP} \times \Delta FVV,$$

where OPV denotes the updated operating point value for the controllable asset, $C_{OPV}$ denotes the operating point value for the controllable asset received from the EMS, $K_{OP}$ denotes the operating point shift value for the controllable asset, and $\Delta FVV$ denotes the difference between the actual value of the forecast variable and the forecast variable value for which the operating point value was determined.

9. The method of claim 1, further comprising:
determining, by the EMS, several additional operating point values and several additional operating point shift values for modified forecast variable values that deviate from the retrieved forecast variable value;
providing, by the EMS, the several additional operating point values and several additional operating point values to the PMS, and wherein the method further comprises:
receiving, by the PMS, the several additional operating point values and the several additional operating point shift values;

selecting, by the PMS, based on the actual value of the forecast variable, one of the operating point values; and updating, by the PMS, the selected operating point value based on the operating point shift value associated with the selected operating point value.

10. The method of claim 1, further comprising transmitting the operating point value and the operating point shift value concurrently to the PMS.

11. An energy management system, EMS for a microgrid, wherein the microgrid includes a plurality of controllable assets, the EMS comprising:
an EMS interface operative to retrieve a forecast variable value for a forecast variable; and
at least one integrated semiconductor circuit operative to:
determine an operating point value for a controllable asset that depends on the retrieved forecast variable value, the operating point value being a function of the forecast variable value;
determine an operating point shift value for the controllable asset, the operating point shift value representing a shift in operating point value in response to a variation in forecast variable value, and the operating point shift value being dependent on a derivative of the function that represents the operating point value in dependence on the forecast variable value; and
provide the operating point value and the operating point shift value to a power management system, PMS, of the microgrid.

12. The energy management system of claim 11, wherein the EMS is configured to:
retrieve plural forecast variable values for plural forecast variables;
determine plural operating point shift values that are indicative of shifts in operating point value in response to variations of the plural forecast variable values; and
provide the operating point value and the plural operating point shift values to the PMS.

13. The energy management system of claim 11, wherein the EMS is configured to determine the operating point value and the operating point shift value for each one of the plurality of controllable assets.

14. The energy management system of claim 13, wherein the EMS is configured such that determining the operating point shift values for the plurality of controllable assets comprises enforcing a constraint on a sum of the operating point shift values.

15. The energy management system of claim 11, wherein the EMS is configured such that the operating point value and the operating point shift value are transmitted concurrently to the PMS.

16. A power management system, PMS, for a microgrid, comprising:
an interface operative to receive an operating point value and an operating point shift value for a controllable asset of the microgrid from an energy management system, EMS, the operating point value being a function of a forecast variable value, and the operating point shift value being dependent on a derivative of the function that represents the operating point value in dependence on the forecast variable value; and
at least one integrated semiconductor circuit operative to determine an updated operating point value for the controllable asset in dependence on the operating point value for the controllable asset, the operating point shift value for the controllable asset, and a difference between an actual value and the forecast variable value for a forecast variable;
wherein the PMS is operative to control the controllable asset based on the updated operating point value.

17. The power management system of claim 16, wherein the at least one integrated semiconductor circuit is operative to determine the updated operating point value in accordance with $$OPV = C_{OPV} + K_{OP} \times \Delta FVV,$$

wherein OPV denotes the updated operating point value for the controllable asset, $C_{OPV}$ denotes the operating point value for the controllable asset received from the EMS, $K_{OP}$ denotes the operating point shift value for the controllable asset, and $\Delta FVV$ denotes the difference between the actual value of the forecast variable and the forecast variable value for which the operating point value was determined.

18. A microgrid, comprising:
a plurality of controllable assets; and
at least one of the power management system (PMS) of claim 16 and an energy management system (EMS) comprising:
an EMS interface operative to retrieve a forecast variable value for a forecast variable; and
at least one integrated semiconductor circuit operative to:
determine an operating point value for a controllable asset that depends on the retrieved forecast variable value, the operating point value being a function of the forecast variable value;
determine an operating point shift value for the controllable asset, the operating point shift value representing a shift in operating point value in response to a variation in forecast variable value, and the operating point shift value being dependent on a derivative of the function that represents the operating point value in dependence on the forecast variable value; and
provide the operating point value and the operating point shift value to the PMS of the microgrid.

19. The power management system of claim 16, wherein the PMS is operative to concurrently receive the operating point value and the operating point shift value.

* * * * *